US006819674B2

United States Patent
Kauppinen et al.

(10) Patent No.: US 6,819,674 B2
(45) Date of Patent: Nov. 16, 2004

(54) MODIFICATION OF SIGNALLING RESOURCES IN A COMMUNICATIONS SYSTEM

(75) Inventors: Risto Kauppinen, Espoo (FI); Jari Skog, Virkkala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/967,261

(22) Filed: Sep. 28, 2001

(65) Prior Publication Data

US 2002/0048276 A1 Apr. 25, 2002

Related U.S. Application Data

(63) Continuation of application No. PCT/FI00/00210, filed on Mar. 16, 2000.

(30) Foreign Application Priority Data

Apr. 6, 1999 (FI) .................................................. 990749

(51) Int. Cl.$^7$ .............................. H04J 3/12; H04M 7/00
(52) U.S. Cl. ........................ 370/410; 370/524; 379/230
(58) Field of Search ................................. 370/410, 467, 370/524, 426; 379/230, 221.09, 221.1, 221.11, 221.2, 229

(56) References Cited

U.S. PATENT DOCUMENTS

| | | | | |
|---|---|---|---|---|
| 5,444,699 A | * | 8/1995 | Watanabe | 370/397 |
| 5,905,724 A | * | 5/1999 | Carson et al. | 370/385 |
| 5,978,387 A | * | 11/1999 | Sherman | 370/468 |
| 6,094,431 A | * | 7/2000 | Yamato et al. | 370/395.21 |
| 6,282,191 B1 | * | 8/2001 | Cumberton et al. | 370/352 |
| 6,333,931 B1 | * | 12/2001 | LaPier et al. | 370/385 |
| 6,404,735 B1 | * | 6/2002 | Beshai et al. | 370/230 |
| 6,438,110 B1 | * | 8/2002 | Rai et al. | 370/254 |
| 6,438,123 B1 | * | 8/2002 | Chapman | 370/351 |

FOREIGN PATENT DOCUMENTS

| | | |
|---|---|---|
| EP | 0817508 | 1/1998 |
| GB | 2306073 | 4/1997 |
| JP | 10257060 | 9/1998 |
| WO | WO 97/09808 | 3/1997 |
| WO | WO 98/49862 | 11/1998 |
| WO | WO 99/34620 | 7/1999 |

OTHER PUBLICATIONS

Joachim. Zepf & Gerhard Rufa; "Congestion and Flow Control in Signaling System No. 7—Impacts of Intelligent Networks and New Services", IEEE journal on selected areas in communicatins, Apr. 3 1994, vol. 12, pp. 501–509.*
Martino De Marco et al; "Bandwidth Re–Negotiation in ATM Networks for High–Speed Computer Communications", GLOBECOM 1995 IEEE Global Telecommunications Conference, Singapore, Nov. 14–16 1995, vol. 1, pp. 393–398.

(List continued on next page.)

Primary Examiner—John Pezzlo
Assistant Examiner—Saba Tsegaye
(74) Attorney, Agent, or Firm—Squire, Sanders & Dempsey LLP (57) ABSTRACT

Disclosed herein is a method for changing characteristics of a signalling link in a communications system including at least two signalling points and at least one signalling link through which signalling information is transmitted from a first signalling point to an adjacent signalling point. The signalling traffic to be relayed is monitored at a signalling point. A procedure for modifying user connections is performed. A modification request message including an identifier value for identifying the object of modification is sent to the adjacent signalling point. The system flexibly adapts to a temporary increase in signalling load. A set of identifier values are used for identifying signalling links allocated in advance to signalling links between adjacent signalling points. When signalling traffic meets a predetermined condition, a signalling link is modified by inserting in the modification message an identifier value belonging to the set.

12 Claims, 4 Drawing Sheets

OTHER PUBLICATIONS

Yuan R et al; A Signaling and Control Architecture for Mobility Support in Wireless ATM Networks, 1996 IEEE International Conference on Communications, ICC Converging Technologies for Tommorrow's Applications, Dallas, Jun. 23–27 1996, vol. 1, pp. 478–484.

Crosby et al; "In–call Renegotiations of Traffic Parameters' Networking: foundations for the Future", San Francisco, Mar. 28–Apr. 7 1998, vol. 2, pp. 638–646.

Lee WC et al; Dynamic Management for Call–Level QOS Guarantee in Integrated Communication Networks Proceedings of the Conference on Computer Communications (INFOCOM), Toronto, Jun. 12–16 1994, vol. 3, pp. 1073–1082.

ITU–T Q.2725.2, "Series Q: Switching and Signalling, Broadband ISDN—B–ISDN application protocols for the network signalling", B–ISDN User Part– Modification procedures, Jul. 1996.

ITU–T Q.2763, "B–ISDN Application Protocols of the Network", Broadband Interated Services Digital Network (B–ISDN)—Signalling System No. 7 B–ISDN User Part (B–ISUP)—Formats and Codes, Feb. 1995.

Recommendation Q.2931, Feb. 1995.

ITU–T Q.2963.1, "Series Q: Switching and Signalling Broadband ISDN—B–ISDN application protocols for access signalling", Peak cell rate modification by the connection owner, Jul. 1996.

* cited by examiner-

MODIFICATION OF SIGNALLING RESOURCES IN A COMMUNICATIONS SYSTEM

This is a continuation of Application No. PCT/FI00/ 00210, filed Mar. 16, 2000.

FIELD OF THE INVENTION

The present invention relates generally to implementation of signalling in a communications system. More specifically, the invention relates to changing the characteristics, particularly the capacity, of a signalling link in a communications network, specifically in an ATM-based communications network. In this context, a signalling link denotes the signalling channel between two adjacent network elements.

BACKGROUND OF THE INVENTION

As is well known, ATM (Asynchronous Transfer Mode) is a connection-oriented packet-switching technique, which has been selected by the international organization for telecommunications standardization, ITU-T, as the technology for implementing a broadband multimedia network (B-ISDN). In an ATM network, the problems of conventional packet-switched networks (such as X.25 networks) have been overcome by transmitting short packets of a constant length (53 octets) called cells. Each cell comprises a 48-octet payload portion and a 5-octet header. In addition to other data, the header comprises address information on the basis of which a cell is routed in the network. Further discussion of an ATM network herein will be omitted as non-essential subject to the understanding of the invention. A closer description can be found in international standards and textbooks of the art.

B-ISDN, which on the conceptual level can be construed as the aim of integrating broadband and narrowband services in the same network, is based on the earlier (narrowband) ISDN model in which the interface between the network and the subscriber is fully digital. However, the services offered in a B-ISDN network require transmission rates that are above the transmission rate of the ISDN network primary rate access. Also in signalling, B-ISDN complies with the out-of-band signalling that is used in the ISDN model (cf. signalling channel D). Out-of-band signalling means that signalling and user data do not share the same channel, but a separate channel is provided for signalling. In a B-ISDN network, virtual channels offer the possibility of separating user channels and signalling channels from each other. In B-ISDN, the signalling messages are thus transmitted as out-of-band messages on separate virtual connections of the ATM layer. Also, the signalling is common channel signalling in which control data pertaining to several communications connections is transmitted on one signalling connection. Dedicated virtual channels are employed for different signalling purposes.

Since the SS7 (Signalling System No. 7) is the international standard for out-of-band signalling systems, it has been modified to suit broadband networks as well, so that it is suited, besides establishing, managing and releasing virtual connections, also for other operations required by an ATM-based network.

The drawback of the present signalling systems and methods is, however, that they are not capable of flexibly and rapidly adapting themselves to a temporary increase in the signalling load. This is due to the fact that there is no resilient modification procedure available for fixed connections, signalling connections included, wherewith their capacity could be changed. Thus, so far it has been necessary to modify fixedly defined connections by means of network management. However, specifically connectionless signalling traffic, which includes e.g. retrieval of various data from databases located in the network, is of such a nature that it may involve—especially in the future-load peaks that are difficult to anticipate. For this reason, it is desirable that also the signalling capacity could be modified more flexibly than heretofore.

SUMMARY OF THE INVENTION

It is an objective of the present invention to offer a remedy to the drawbacks described above by providing a solution wherewith the signalling capacity can be flexibly changed in the network when the signalling load increases temporarily.

This objective is achieved with the solution in accordance with the invention, which is defined in the independent claims.

The idea of the invention is to reserve for signalling links between adjacent network elements one or more identifiers that cannot be used for signalled connections, and thereafter to use the standard modification procedure intended for user connections for a novel purpose, i.e. for changing the characteristics (capacity) of the signalling link. The known modification pro cedure intended for user connections is thus utilized to change the capacity of the signalling link between two adjacent network elements. Modification is initiated only in those network elements in which a need for modification is detected, and thus the modification usually only relates to a specific link between two adjacent exchanges and extends from one end to the other of a signalling connection only if a need for additional capacity is simultaneously detected at all successive signalling points in the connection. Also in this case, the modification of each signalling link is independent of the other signalling link. Thus, the modification of successive links in the same connection are not dependent on one another, as is the case in user connections.

The capacity can be restored to its original value for example after no blocking or excess load has been detected during a predetermined period of time (e.g. during one hour). The restoration can be based on measuring the signalling load in the node, but also on the traffic situation or capacity requirement of the user connections.

With the solution in accordance with the invention, a dynamic signalling network is achieved that can automatically increase the signalling capacity in those parts of the network in which the signalling load increases temporarily.

An important further advantage of the solution in accordance with the invention is that it makes efficient use of the modification procedures according to the current recommendations, with the result that it can also be added with very small changes to a network in which said procedures have been implemented.

BRIEF DESCRIPTION OF THE DRAWINGS

The invention and its preferred embodiments will be described more closely in the following with reference to examples in accordance with the accompanying drawings, in which.

DETAILED DESCRIPTION OF THE INVENTION

Figure 1:
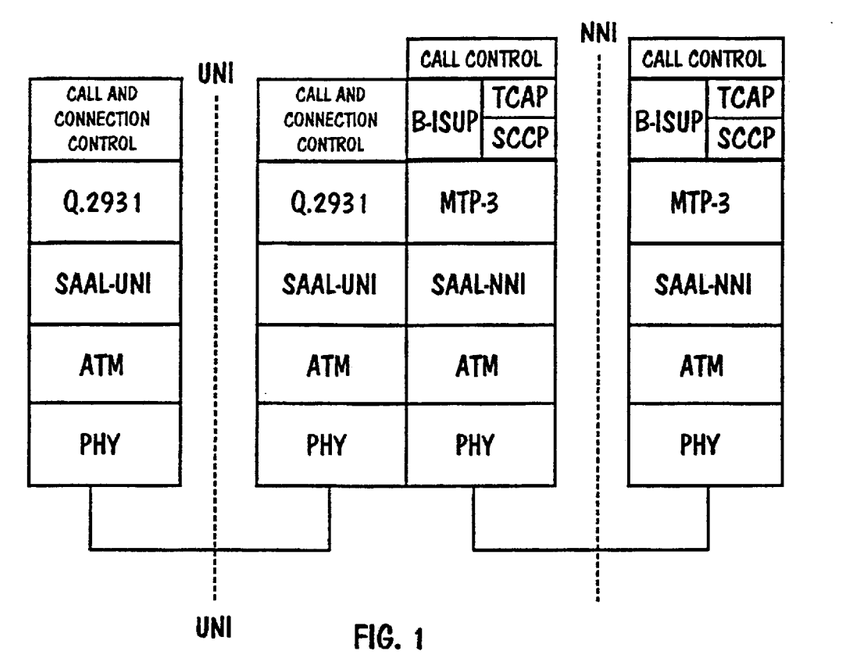
FIG. 1 illustrates the signalling protocol stacks at UNI and NNI interfaces.

FIG. 1 illustrates the known protocol stacks by means of which signalling at the UNI interface (User-Network Interface) and NNI interface (Network-Network Interface) of a B-ISDN network is carried out. As can be seen from the figure, in both cases the three lowermost layers comprise a physical layer PHY, an ATM layer ATM, and an SAAL layer (Signalling ATM Adaptation Layer), the last-mentioned being the layer corresponding to the ML layer on the Control Plane, i.e., constituting the signalling AAL. In the B-ISDN Protocol Reference Model, the Control Plane is the plane containing the functions of call and connection control and the functions of the signalling relating thereto.

The signalling protocol for UNI interfaces is defined in ITU-T specification Q.2931 (Digital Subscriber Signalling System No. 2). These operations attend to the connection set-up and release. At NNI interfaces, on the other hand, the signalling application protocol is provided by B-ISUP (Broadband-ISUP), beneath which there is an MTP3 layer. Both of these have been modified from the relevant parts of the SS7 standard (MTP3 and ISUP). B-ISDN uses the third level of the message transfer part (MTP) only, since the functionalities of MTP1 and MTP2 have been implemented with the SAAL layer and the layers beneath.

The SAAL layers are also differently configured depending on whether they are located at the UNI interface or the NNI interface.

B-ISUP is responsible for processing messages relating to call and connection control and also for the new functions of connection control. Transaction Capability Application Part TCAP and Service Connection Control part SCCP, which are today widely used e.g. in intelligent network applications, are used to implement the new functions of call control.

Since all of the protocol layers described above are known as such, they will not be described in detail in this context.

In the following, the invention will be described first with reference to examples relating to NNI interfaces, since the advantage afforded by the method of the invention will be greatest with NNI interfaces. First the known procedures upon which the invention is based will be described.

Figure 2:
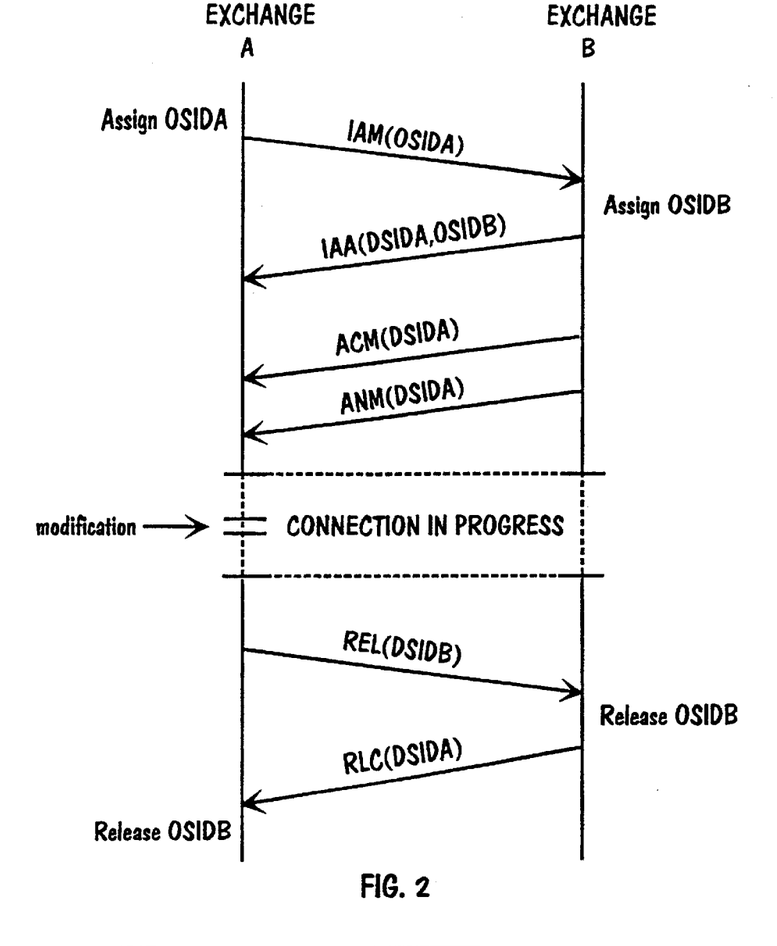
FIG. 2 shows an example of connection set-up and release carried out at an NNI interface.

FIG. 2 illustrates message exchange between two adjacent exchanges (A and B) in typical connection set-up. To start with, exchange A sends an initial address message IAM. At this stage, exchange A assigns an identifier to this side of the connection. This identifier called OSIDA (Origination Signalling ID A) is included, among other things, in the initial address message to be sent. When the IAM message arrives at exchange B, the latter also assigns a corresponding identifier OSIDB (Origination Signalling ID B) to the connection. By means of these identifiers, the exchanges can identify messages pertaining to said connection. Thereafter, exchange B sends to exchange A an acknowledgement message IM (IAM Acknowledgement Message), indicating that the IAM message has been accepted and resources are available. Exchange B incorporates into this message, among other things, identifier DSIDA (Destination Signalling ID A) which is the same as OSIDA assigned by exchange A and identifier OSIDB. If the IAM message is complete and contains all data needed for processing the call, exchange B additionally sends to exchange A a message ACM (Address Complete Message), including e.g. identifier DSIDA. Thereafter exchange A knows that connection set-up is being proceeded with in the direction of the called subscriber.

When the called subscriber responds, exchange B sends to exchange A a message ANM (Answer Message). Also this message includes the identifier DSIDA. After exchange A has received said message, a bidirectional virtual connection has been established and the calling and called subscriber can communicate with one another.

When any of the subscribers terminates the connection, the exchange associated with the terminating subscriber sends a message REL (Release Message), which initiates the release of the connection. (The message includes the identifier DSIDB, which is the same as OSIDB). Having received such a message, the exchange at the opposite end releases the identifier assigned to the connection for new use and sends to the opposite end a message RLC (Release Complete Message), indicating to the opposite end that the relevant virtual connection has been released. (The message includes the identifier DSIDA, which is the same as OSIDA). As a result, also the opposite end releases the identifier of the connection for new use.

In the present invention, the identifiers described above will be utilized in the manner to be described hereinbelow.

As stated above, a modification procedure wherewith the traffic parameters of a user connection can be modified has been defined for user connections in the current recommendations (ITU-T Recommendation Q.2725.2 for an NNI interface and Recommendation Q.2963.1 for a UNI interface).

Figure 3:
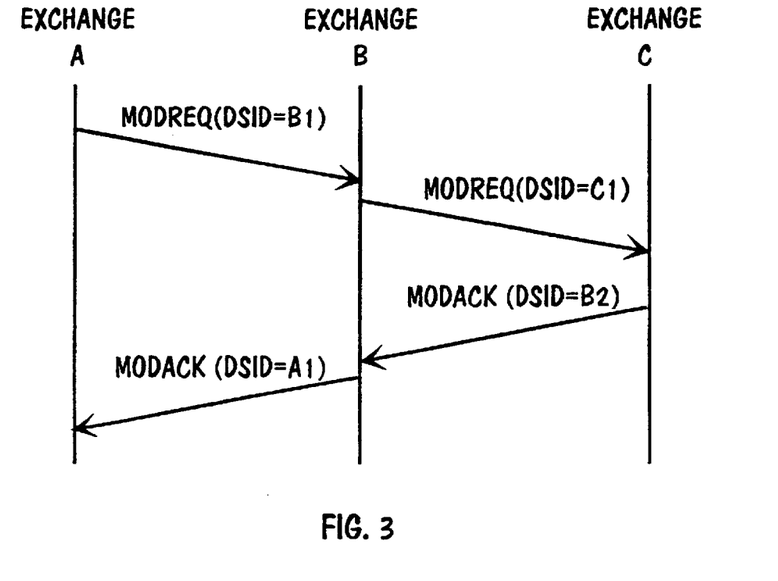
FIG. 3 shows an example of successful modification of the capacity of a user connection.

FIG. 3 illustrates an example of how the bandwidth is successfully changed on the virtual connection between exchanges A and c when there is one transit exchange between the exchanges. The exchange initiating the modification sends to the next exchange a special modification message MODREQ (Modify Request), including e.g. identifier DSID (Destination Signalling ID), the value (B1) of which will identify at the next exchange (B) the connection to which the request relates. In addition to this identifier, the request message also contains e.g. information on the requested ATM cell rate. Upon receipt of this message, transit exchange B allocates resources as indicated in the message on the incoming and outgoing side of the exchange and forwards the MODREQ message to exchange C. In this message, the value (C1) of the identifier DSID is naturally the one by which exchange C will identify the virtual connection concerned. Since exchange C is a terminal exchange, it allocates the resources on its incoming side. In response to successful resource allocation, it sends to exchange B an acknowledgement message MODACK (Modify acknowledge), including e.g. an identifier by which exchange B can identify the virtual connection that the acknowledgement relates to. Exchange B forwards the acknowledgement to exchange A, using the identifier assigned by exchange A to said connection as the value (A1) of identifier DSID. Thereafter, the new bandwidth is available. It should be noted that since exchange B is a transit exchange, two values (B1 and B2) have been allocated for said virtual connection therein, one in each direction.

The bandwidth of the connection can be changed in one or both transmission directions, and the bandwidth of each transmission direction can be decreased or increased independently of the reverse direction.

The modification of the user connections is carried out in the manner described above link by link from the initiating terminal exchange to the opposite terminal exchange. The modification will only be successful if it is successful in every link span of the connection. The modification procedure can be performed only when connection set-up and release processes are not in progress, that is, at the point indicated in FIG. 2, for example.

Since the modification procedures are known as such, they will not be described more closely in this connection. If the reader so desires, he can find more background information in the recommendations referred to above. The formats of B-ISUP messages have been specified in ITU-T Recommendation Q.2763, wherein more background information is to be obtained.

In the present invention, the modification procedure described above is utilized to change the capacity of a signalling link, employing the connection identifiers described in the context of FIG. 2. The modification takes place between two adjacent exchanges only in those parts of the network in which a need for changing the capacity of the signalling link is detected.

As stated in the above, an identifier of the kind described above for identifying a connection does not exist for permanently defined connections, such as signalling connections. However, in order that modification messages may be identified as pertaining to a specific signalling link, in the present invention one or more values are reserved in advance for the signalling links from the SID space, and this value cannot be used for the signalled connections. In the following, the latter alternative (reservation of more than one value) will first be described, since it is regarded as the primary alternative.

Figure 4:
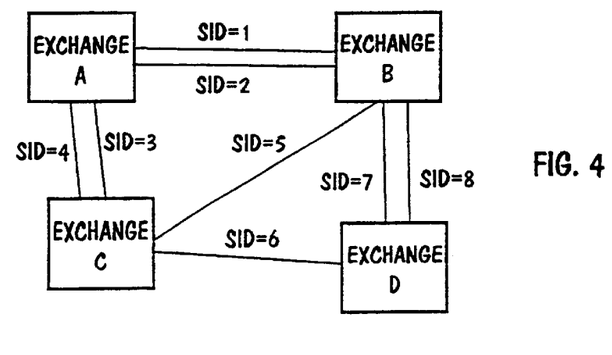
FIG. 4 illustrates the advance configuration of signalling links in accordance with the invention.

In the primary embodiment of the invention, a dedicated, unique SID value is assigned to each signalling link within the network or a part thereof. FIG. 4 illustrates this principle by depicting a network or sub-network comprising nodes A, B, C and D, wherein the signalling links between the nodes are denoted by lines between the nodes. In this example, the signalling links are assigned values SID=1 . . . 8, said values not being available for identifying signalled connections. It should further be noted that the signalling links are signalling channels between two adjacent signalling points, and the figure does not discuss how they are located on the physical transmission medium. Each signalling link has its dedicated, unique value either within the area of the entire network or in its own sub-network. What is essential to the invention is that two adjacent network elements are provided with values by means of which the signalling links can be unequivocally identified. Hence, reuse of the SID values used by the signalling links in other parts of the network is possible.

Figure 5:
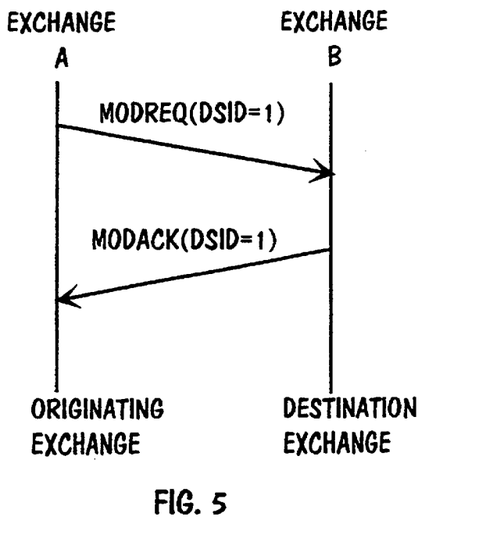
FIG. 5 illustrates message exchange performed by two adjacent exchanges when the capacity of the signalling link between the exchanges is changed in accordance with the invention.

FIG. 5 shows an example of message exchange in connection with a successful change of the signalling link capacity in accordance with the invention, when it is presumed that exchange A in FIG. 4 detects a need for additional capacity in the direction of exchange B. The modification-initiating exchange A sends a modification message MODREQ in accordance with the recommendations to exchange B at the opposite end of the signalling link. However, in this message identifier DSID has a value that has been configured in advance to point to a specific signalling link in the network. The receiving exchange finds on the basis of this value that a modification request relating to a signalling link between said exchanges is involved, upon which it initiates a process for allocating the requested bandwidth to said link. When the desired resources have been allocated, exchange B sends an acknowledgement message MODACK back to exchange A. The message exchange is thus fully in accord with the recommendations, but the messages include a DSID value that points to a specific signalling link between said exchanges.

Figure 6:
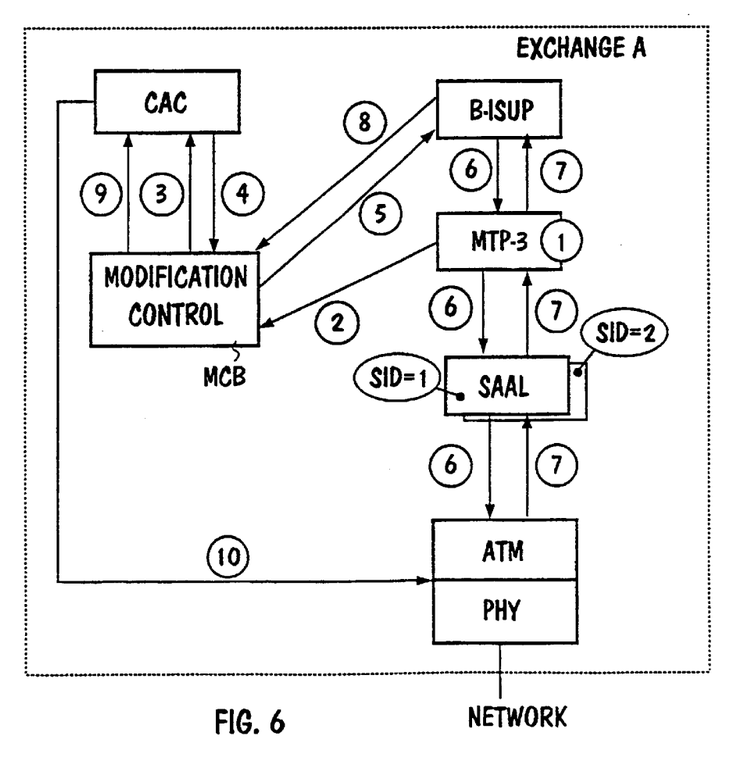
FIG. 6 illustrates internal operations in an exchange initiating modification in accordance with the invention.

FIG. 6 illustrates the modification process within the modification-initiating exchange A. The different steps of the process are denoted by circled numbers. Initially the exchange detects the need to increase the signalling capacity in the direction of exchange B. The need for change can be monitored for example at the MTP3 layer, since the tasks of said layer include management functionalities of the signalling network, e.g. monitoring of the signalling traffic to detect overload and congestion situations. Hence, the observation regarding the need to add signalling capacity is obtained from the MTP3 layer (step 1), which informs the modification control block MCB of the detected need by sending it an internal message (step 2) including e.g. the signalling point code of the exchange in the direction of which congestion or an excess load has been detected. Having received said message, the control block MCB sends (step 3) a request for additional capacity to block CAC, which performs the call admission control (CAC) procedure in the exchange. The request relays the above signalling point code and information on the new capacity need. The need for additional capacity is defined in control block MCB.

CAC examines on the basis of the message which signalling link in said direction (to exchange B) can be assigned additional capacity, so that the desired total capacity is reached. CAC allocates the relevant capacity and informs the control block MCB as to the SID value of said signalling link. (It should be noted that in this context allocation denotes logical distribution of resources among virtual connections, as in reality the connections utilize common resources, such as buffers and the bandwidth of the physical transmission medium. Logical distribution is necessary in view of managing the degree of utilization of the resources.) Thereafter the modification control block sends a modification request to B-ISUP (step 5). This request includes the signalling point code for exchange B, the SID identifier of said signalling link, and the necessary traffic parameters, such as the capacity allocated. Having received this internal message, the signalling protocol performs a modification procedure of the kind described above, that is, sends a MODREQ message to exchange B (step 6). The next step (step 7) is to receive a MODACK message from the network (cf. FIG. 5). Having received this acknowledgement message, B-ISUP informs the control block MCB of the fact that the modification was successful (step 8). The control block reports the successful operation to CAC (step 9), which carries out the change of capacity in a known manner similarly as in the case of user connections.

Figure 7:
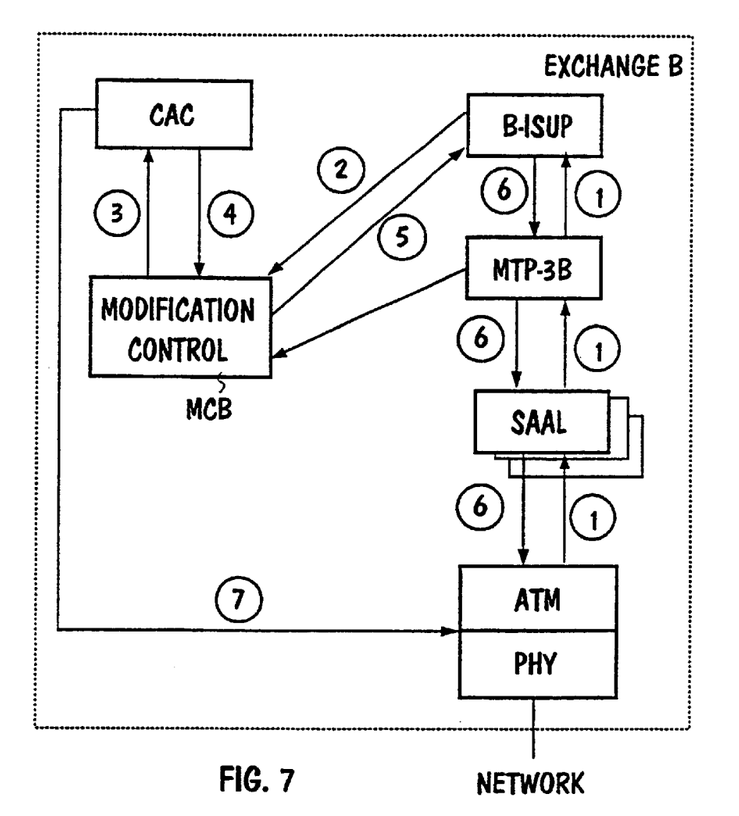
FIG. 7 illustrates internal operations in an exchange receiving a modification service request in accordance with the invention.

FIG. 7 illustrates the internal process in exchange B receiving the modification request message. On the receiving side, B-ISUP first receives a MODREQ message, including e.g. a special value for SID (step 1). B-ISUP is aware of the SID values reserved for the signalling links, and thus it recognizes that the message concerns modification of a signalling link and informs the modification control block MCB of the arrival of a modification request (step 2). This message relays the SID value and the traffic parameters received in the message as well. The control block MCB relays the request to CAC (step 3) which checks whether there is existing capacity, i.e., whether the request can be granted. If this is the case, CAC accepts the modification and informs the control block MCB of the acceptance (step 4). The control block relays the acceptance message to B-ISUP (step 5), which sends the MODACK message to the network (step 6) in response to said message. Thereafter CAC changes the capacity in the known manner similarly as in the case of user connections.

Instead of CAC allocating the entire capacity to one signalling link, it can also allocate additional capacity in such a way that the desired total capacity is divided between more than one signalling link in said direction in the desired proportion. In such a case, the modification procedure described above is performed separately on each signalling link to which capacity is allocated.

In the first embodiment described above, unique SID values were used for all signalling connections in the network or a part thereof. In another embodiment of the invention, the same predetermined SID value (e.g. the value 1) is always used in the entire network (or sub-network). In such a case, the modification request is sent, in order to identify this link, specifically on that signalling link that one wishes to modify. Since MTP3 makes the decision as to which signalling link the message is sent to, MTP3 must be separately informed within the node as to which signalling link is concerned. On the transmitting side, this is easy to implement. On the receiving side, however, the required changes are more difficult to carry out, since the B-ISUP layer must interrogate "downwards" which link this message came from when it detects a predetermined SID value in the message. This is due to the fact that the MTP3 layer does not examine the received message and neither do the layers beneath, but the MTP3 layer relays the message arriving at the node directly to the B-ISUP layer. Hence, upon receipt of the message the B-ISUP layer must interrogate "downwards" which signalling link said message came from.

Figure 8:
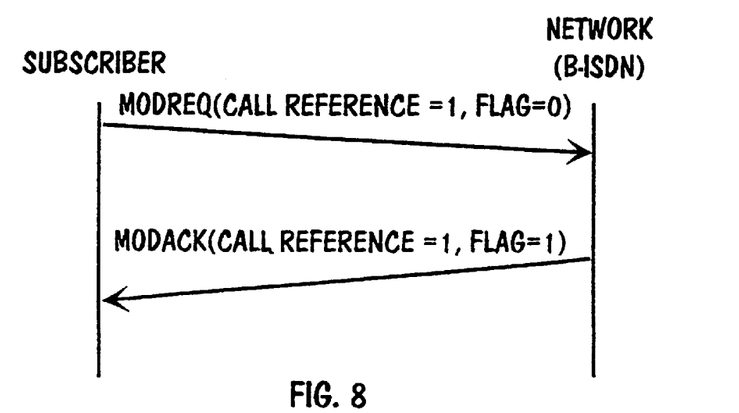
FIG. 8 is an example of message exchange when the capacity of the signalling link is changed in accordance with the invention at an UNI interface.

As stated previously, a corresponding modification procedure pertaining to user connections is specified in ITU-T Recommendation Q.2963.1 for DSS2 signalling (Digital Subscriber Signalling System No. 2) for use at a UNI interface. DSS2 signalling employs a Call Reference field of 4 octets in the messages to be sent for identifying the connection. This field is made use of in the present invention in accordance with the first or second embodiment described above. In other words, one or more Call Reference values that cannot be used for the signalled connections are reserved for the signalling links. The Call Reference field includes a one-bit Call Reference flag, identifying which end has assigned the Call Reference value. In the modification of a signalling link in accordance with the invention, this flag is used in a similar way: the end transmitting the modification request message assigns the Call Reference value and uses the value zero for the flag. The opposite end uses the same Call Reference value and value one for the flag. FIG. 8 illustrates message transfer across a UNI interface in an exemplary case where the characteristics of the signalling link are successfully changed. Thus, the existing recommendations are made use of at both UNI and NNI interfaces to increase the capacity of a signalling link. In the case of a UNI interface, the SAAL-UNI layer is the entity making known the need for adding signalling capacity (cf. FIG. 1).

Even though the procedure in accordance with the invention is implemented between two adjacent network elements, in an end-to-end connection the above procedure can be initiated at any (one or more) network element in which a need for modifying the capacity of a signalling link is detected. The signalling point detecting the need for additional capacity is capable of increasing the capacity on one or more signalling links.

The restoring of the capacity of the signalling link back to its original value can be realized in a variety of ways. For example, the MTP3 layer can continuously send information on the current load situation to the control block. On the other hand, the control block can interrogate the MTP3 layer about the load situation at given intervals and initiate retrieval if the response received meets predetermined criteria The restoration can also take place in slightly different ways depending on how vital the restoration is for the other connections. The control block can for instance interrogate CAC how vital it is to restore the additional capacity to the use of the user connections and adjust the intervals of the interrogations made to the MTP3 layer accordingly, so that vital resources are restored as soon as possible to the use of the user connections. The restoration can thus be dependent on, besides the quantity of signalling traffic, also on the quantity of user traffic.

Even though the invention has been explained in the foregoing with reference to the examples in accordance with the accompanying drawings, it is evident that the invention is not so restricted, but it can be varied within the scope of the inventive idea set forth above and in the appended claims. For example, although the invention has been described using as examples the current signalling protocols of the ATM-based network, it is evident that the invention can also be applied to future networks whose signalling methods or protocols support a modification procedure of the kind described above.

What is claimed is:

1. A method for changing the characteristics of a signalling link in a communications system comprising at least two signalling points and at least one signalling link separate from user connections through which signalling link only signalling information is transmitted from a first signalling point to an adjacent signalling point, the method comprising:

allocating a set of identifier values to the signalling links between adjacent signalling points, the identifier values being used for identifying the signalling links;

monitoring signalling traffic to be transferred at the first signalling point;

starting a modification procedure in which a modification request message including an identifier value selected from the set of identifier values allocated to the signalling links is sent to the adjacent signalling point; and when signalling traffic meets a given predetermined condition, sending the modification request message including said identifier value.

2. The method according to claim 1, wherein the system further comprises a unique identifier value allocated to each signalling link for identifying the signalling link.

3. The method according to claim 1, wherein a part of the system further comprises a unique identifier value allocated to each signalling link for identifying the signalling link.

4. The method according to claim 1, further comprising one common identifier value being allocated to all signalling links in the system, and the modification request message being sent on that signalling link to which modification relates.

5. The method according to claim 1, wherein a part of the system further comprises one common identifier value being allocated to all signalling links in said part, and the modification request message being sent on that signalling link to which modification relates.

6. The method according to claim 1, wherein the signalling link is restored to the state that prevailed before modification as soon as the signalling traffic meets a predetermined criterion continuously for a predetermined time.

7. The method according to claim 1, wherein the signalling link is restored to the state that prevailed before modification by monitoring the state of the signalling point, by performing an interrogation of a state of the signalling point at predetermined intervals, and initiating restoration as soon as the state meets predetermined criteria.

8. A communications system comprising:

at least two signalling points, at least one signalling link separate from user connections through which signalling link only signalling information is transmitted from a first signalling point to an adjacent signalling point, the signalling point comprising:

means for transferring signalling traffic, means for monitoring signalling traffic to be transferred, means for modifying capacity characteristics of an individual connection by a modification procedure in which a modification request message including an identifier value for identifying an object of modification is sent to the adjacent signalling point, wherein a set of identifier values to be used for identifying signalling links are allocated in advance to the signalling links of the system, a specific identifier value being associated with each individual signalling link, the means for modifying are responsive to means for monitoring to initiate the modification procedure in response to a detected quantity of signalling traffic, and the means for modifying are adapted to use the identifier value allocated to the signalling link in the modification request message when the means for monitoring initiate the modification procedure.

9. The system according to claim 8, wherein a dedicated, unique identifier value is allocated to each signalling link in the system.

10. The system according to claim 8, wherein a dedicated, unique identifier value is allocated to each signalling link in a part of the system.

11. The system according to claim 8, wherein the same identifier value is allocated to all signalling links in the system.

12. The system according to claim 8, wherein the same identifier value is allocated to all signalling links in a part of the system.

* * * * *